United States Patent [19]

Hwang

[11] Patent Number: 5,421,743
[45] Date of Patent: Jun. 6, 1995

[54] SAFETY BATTERY SNAP

[76] Inventor: Steve H. S. Hwang, 5F, No. 3-1, Lane 191, Young Ho Rd., Chung Ho City, Taipei Hsien, Taiwan, Prov. of China

[21] Appl. No.: 273,343

[22] Filed: Jul. 11, 1994

[51] Int. Cl.⁶ .............................................. H01R 3/00
[52] U.S. Cl. ................... 439/500; 439/742; 429/97
[58] Field of Search ............ 439/500, 620; 429/97, 429/98, 99, 100, 7-9, 121, 163

[56] References Cited

U.S. PATENT DOCUMENTS

| | | | |
|---|---|---|---|
| 4,608,528 | 8/1986 | Stillwell | 429/100 |
| 4,752,539 | 6/1988 | Vatter | 429/100 |
| 4,991,225 | 7/1990 | Holcomb et al. | 429/100 |

*Primary Examiner*—David L. Pirlot
*Attorney, Agent, or Firm*—Bucknam and Archer

[57] ABSTRACT

A battery snap including an insulative plate, two conductive rivets, a cylindrical plug, a cylindrical socket and a holder, wherein each conductive rivet is first inserted through a respective terminal hole on the insulator to connect together with the cylindrical plug or socket, with a lug fastening one end of an electric wire whose other end will be guided to pass through the respective guide hole on the insulator for entering a central hole also formed on the insulative plate and being led out from a wire hole on an endless wall on the holder when the insulative plate, conductive rivets, cylindrical plug and socket are put into the holder; the endless wall on the holder being made higher than the cylindrical plug and socket, so that they are not seen from the outside to increase safety in use.

2 Claims, 2 Drawing Sheets

SAFETY BATTERY SNAP

BACKGROUND OF THE INVENTION

The present invention relates to a battery snap, and more particularly to a safety battery snap which can increase the safety in use by receiving the cylindrical plug and socket in a holder, and using the method of rivet jointing to connect conductive rivets with cylindrical plug and sockets and electric wires to eliminate any problems caused by conventional soldering method for assembling battery snap, such as poor contact and heavy metal poisoning, etc.

A variety of mobile electric appliances are known and widely in use. These mobile electric appliances commonly use dry batteries for power supply, and have battery snaps for fastening the batteries.

Conventionally, the hot and neutral wires in an electric appliances are directly soldered to the battery snap thereof. This connecting method is complicated to complete, and the wires may be disconnected from the battery snap easily when stretched. Further, because the tin solder may be oxidized easily, the conductivity of the battery snap will be affected.

Also, it is known that the cylindrical plugs and sockets of conventional battery snaps are integrally made from thin metal sheet, having sharp burrs left to give a threat of cutting the user. Besides, when the cylindrical plug and socket of a battery snap are exposed, it is likely to negligently contact them with a conductor, heating the battery to cause danger; or when they are negligently contacted with a power supply, it is likely to damage the electric appliance thus used, and even cause a bodily injury.

In the U.S. Pat. No. 5,312,269 filed by the applicant of the present invention, it disclosed a battery snap comprising an insulative plate 1, two conductive rivets 2, a cylindrical plug 3 and a cylindrical socket 4. The insulative plate 1 has two terminal holes 11 spaced according to the pitch between the socket and plug terminals on either end of the battery to be connected, through which the cylindrical rivet body 22 of either conductive rivet 2 projects for inserting into a center through hole 34 of the cylindrical plug 3 or a center through hole 42 of the cylindrical socket 4. Then, by hammering down the rivet body 22 of either conductive rivet 2 and a flange 33 of the cylindrical plug 3 or the socket body 41 of the cylindrical socket 4, the insulative plate 1, conductive rivets 2, cylindrical plug 3 and cylindrical socket 4 are thus assembled together. In practice, an insulative covering 5 made from a flexible material may be used. The insulative covering 5 is comprised of an upper portion and a lower portion peripherally sealed together by a seaming line 52 for holding the insulative plate 1 and conductive rivets 2 on an inside, having terminal holes 51 on the upper portion corresponding to the terminal holes 11 on the insulative plate 1 for exposing the cylindrical plug 3 and socket 4, and a wire hole 53 at a suitable location for leading out electric wires.

SUMMARY OF THE INVENTION

The present invention eliminates the aforesaid drawbacks. It is the object of the present invention to provide a battery snap for increasing the safety in use by receiving the cylindrical plug and socket in a holder, and using the method of rivet jointing to connect conductive rivets with cylindrical plug and socket and electric wires to eliminate any problems caused by conventional soldering method for assembling battery snap.

DETAILED DESCRIPTION OF THE PREFERRED EMBODIMENT

Figure 1:
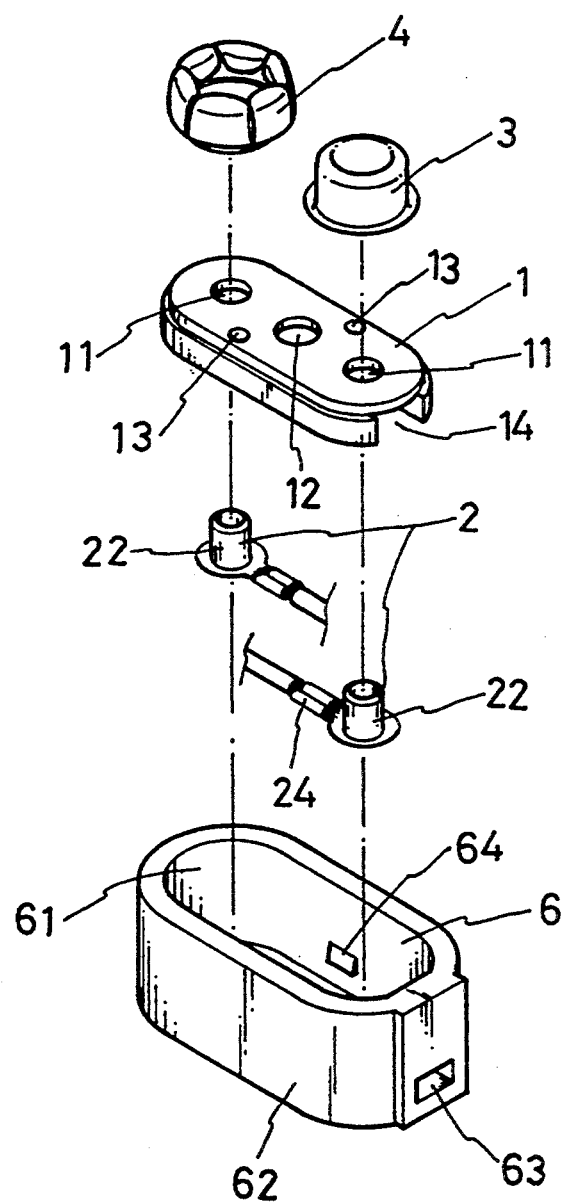
FIG. 1 is a perspective exploded view of a battery snap embodying the present invention.
Figure 2:
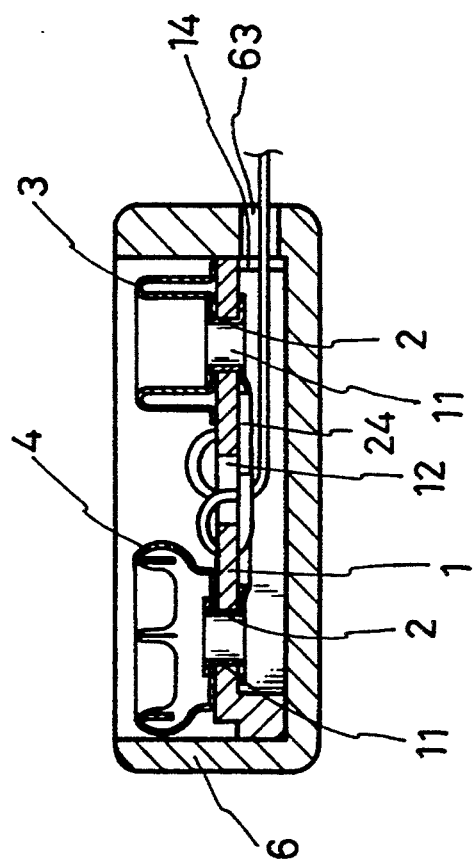
FIG. 2 is a sectional assembly view thereof.

Referring to FIGS. 1 and 2, a battery snap as constructed in accordance with the present invention is generally comprised of an insulative plate 1, two conductive rivets 2, a cylindrical plug 3, a cylindrical socket 4, and a holder 6.

The insulative plate 1 is made from a non-conductive material in a flat shape, having two spaced terminal holes 11 for receiving the conductive rivets 2 respectively, a larger hole 12 at the center, and two spaced guide holes 13 disposed at the opposite sides of the central hole 12 for guiding the electric wires connected with the conductive rivets 2 to pass therethrough respectively before these electric wires are jointly inserted through the central hole 12 for drawing out of a notch 14 formed at one side of the insulative plate 1 when the conductive rivets are received in their respective terminal holes 11.

Each conductive rivet 2 is provided with a cylindrical rivet body 22 at the center for fastening the cylindrical plug 3 or socket 4, and a lug 24 at one side for fastening the conductor of a respective electric wire.

The holder 6 is made having an opening only at the top to define a well 61 by an endless wall 62 and in a shape corresponding to the insulative plate 1 for receiving the assembled battery snap therein. The endless wall 62 is preferably made higher than the cylindrical plug 3 and socket 4 when they are held in place inside the well 61, so that th cylindrical plug 3 and socket 4 are not seen from outside. Further, the endless wall 61 is deburred to increase the safety in use, and a wire hole 63 corresponding to the notch 14 at a suitable place for leading out the electric wires of cylindrical plug 3 and socket 4.

In order to firmly secure the insulative plate 1 in the well 61, a plurality of spaced tenons 64 may be made along the periphery of the endless wall 64 inside the well 61 to act as stops for keeping the insulative plate 1 from falling off when it is inserted into the well 61.

For assembling, conductive rivets 2 are first inserted through respective terminal holes 11 to connect together with cylindrical plug 3 and socket 4, making the electric wires of conductive rivets 2 to be inserted through the respective guide holes 12 before jointly entering the central hole 12, where these electric wires are drawn out through the notch 14 to complete the assembly of the battery snap of the present invention. Then, the electric wires are led out from the wire hole 63 on the endless wall 62 when when the assembled battery snap is put into the well 64 and kept in place by using the tenons 64 as stops, whereby the battery snap can function safely.

As the endless wall 62 is made higher than the cylindrical plug 3 and socket 4 to have them not seen from outside, it can avoid injury from accidental cutting. Conductive rivets 2, cylindrical plug 3, cylindrical socket 4, and the electric wires are connected together in the form of riveting, which prevents danger of heavy metal poisoning likely occurred from a welding method, thus offering a safer effect.

While only one embodiment of the present invention has been shown and described, it will be understood that various modifications and changes could be made without departing from the spirit and scope of the present invention.

What is claimed is:

1. A safety battery snap comprising:

an insulative plate made from a non-conductive material in a flat shape, having two terminal holes spaced according to a pitch between socket and plug terminals on either end of the battery to be connected, a central hole for inserting the electric wires, two guide holes disposed at opposite sides of the central hole for guiding a respective electric wire to pass through, and a notch formed at one side through which the electric wires can be drawn out;

two conductive rivets, each conductive rivet comprising a cylindrical rivet body at the center, and a lug at one side for fastening one end of a respective electric wire;

a cylindrical plug fastened to the cylindrical rivet body of either conductive rivet for connecting the socket terminal of the battery; and a cylindrical socket fastened to the cylindrical rivet body of either conductive rivet for connecting the plug terminal of the battery;

a holder having an opening only at the top to define a well by an endless wall for receiving the insulative plate, conductive rivets, and a cylindrical plug and socket therein after their assembling, and the endless wall having a wire hole corresponding to the notch on the insulative plate for leading the electric wires out of the holder;

wherein each conductive rivet is inserted through a respective terminal hole to connect together with the cylindrical plug or socket, with a lug fastening one end of an electric wire opposed end will be guided to pass through the respective guide hole for entering the central hole and being led out from the wire hole on the endless wall when the insulative plate, conductive rivets, and cylindrical plug and socket are put into the holder; the endless wall on the holder being made higher than the cylindrical plug and socket, so that they are not seen from the outside to increase safety in use.

2. The battery snap of claim 1 wherein said holder being provided with a plurality of tenons along the periphery of said endless wall inside said well to act as stops for keeping said insulative plate in place when it is put into said holder.

* * * * *